(12) United States Patent
Contino et al.

(10) Patent No.: US 7,870,274 B1
(45) Date of Patent: Jan. 11, 2011

(54) PLUG-IN FILE SHARING

(75) Inventors: Jeffrey R. Contino, Shawnee, KS (US);
Warren B. Cope, Olathe, KS (US);
Douglas Alan Olding, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 295 days.

(21) Appl. No.: 12/133,501

(22) Filed: Jun. 5, 2008

(51) Int. Cl.
G06F 15/16 (2006.01)
G06F 15/167 (2006.01)

(52) U.S. Cl. .................................. 709/229; 709/216
(58) Field of Classification Search ............... 709/203, 709/208, 212, 216, 219, 229
See application file for complete search history.

(56) References Cited

U.S. PATENT DOCUMENTS

| 2003/0074529 A1 | 4/2003 | Crohas | |
|---|---|---|---|
| 2003/0216954 A1* | 11/2003 | Buzzelli | 705/10 |
| 2006/0010270 A1* | 1/2006 | Zhang | 710/74 |
| 2007/0186212 A1* | 8/2007 | Mazzaferri et al. | 718/1 |
| 2007/0198656 A1* | 8/2007 | Mazzaferri et al. | 709/218 |
| 2007/0201502 A1* | 8/2007 | Abramson | 370/429 |
| 2007/0204115 A1* | 8/2007 | Abramson | 711/154 |
| 2007/0289000 A1* | 12/2007 | Weiss | 726/5 |
| 2008/0184125 A1* | 7/2008 | Suleiman et al. | 715/734 |
| 2009/0031006 A1* | 1/2009 | Johnson | 709/218 |
| 2009/0298480 A1* | 12/2009 | Khambete et al. | 455/414.1 |

OTHER PUBLICATIONS

CNET Reviews; "Tritton WiFi NAS;" Nov. 26, 2007; 4 pages; http://reviews.cnet.com/external-hard-drives/tritton-wifi-nas/4505-3190_7-31149112.html?tag=mp.
Micro Anvika UK; "ASUS 40GB Wireless Hard Disk Drive;" Nov. 26, 2007; 2 pages; http://www.microanvika.com/product.asp?TXT=INFO&PNO=ASU54305A&ref=side banner&cam=ASU54305A.
Belkin; "Wireless G USB Network Adapter;" Nov. 26, 2007; 2 pages; http://catalog.belkin.com/IWCatProductPage.process?Product_Id=179211.
Memsen Corporation; "Mobile Interactive Marketing—Coming Soon!;" Nov. 26, 2007; 7 pages; http://www.memsen.com/datavendor_desc.htm.
Memsen Corporation; "Everybody has something to Share;" Nov. 26, 2007; 1 page; http://www.memsen.com/index.htm.

* cited by examiner

*Primary Examiner*—Ario Etienne
*Assistant Examiner*—Sargon N Nano

(57) ABSTRACT

First data is received from a network. The first data includes data stored by a mass storage device. The first data is sent to a first mobile communication device via a first wireless communication link. The first mobile communication device is enumerated by a first computer system as a first locally attached mass storage device. The first mobile communication device communicates the first data to the first computer system as data that was stored on the first locally attached mass storage device. The first data is sent to a second mobile communication device via a second wireless communication link. The second mobile communication device is enumerated by the second computer system as a second locally attached mass storage device. The second mobile communication device communicates the first data to the second computer system as data that was stored on the second locally attached mass storage device.

10 Claims, 6 Drawing Sheets

PLUG-IN FILE SHARING

RELATED APPLICATIONS

This application is related to U.S. patent application Ser. No. 11/945,524, titled "EMULATING A REMOVABLE MASS STORAGE DEVICE" filed on Nov. 27, 2007.

TECHNICAL BACKGROUND

Small, lightweight, removable and rewritable storage devices are becoming more popular. These devices, such as Universal Serial Bus (USB) "keychain drives," USB flash drives, memory sticks, or flash memory cards offer advantages over floppy disks. They are smaller, faster, more reliable, and more durable than floppy disks. Their reliability and durability is typically a result of the fact that these drives have no moving parts.

To access or store data on a flash drive, the drive must be connected to a computer. Typically, this is done by plugging the device into a port built into the computer. These flash drives, like other plug-in devices, often can be connected and disconnected from the computer without opening the computer's enclosure. Once connected, the computer can then communicate with the flash drive using a mass storage standard. These standards are supported by many modern operating systems such as Windows and Linux. The plug-in connection may also supply power to the flash drive.

The Universal Serial Bus is defined in the Universal Serial Bus Specification, revision 1.1 and Universal Serial Bus Specification, revision 2.0 which are hereby incorporated herein by reference. These documents are available from the USB Implementers Forum web page at www.usb.org.

Overview

A method of operating a communication system is disclosed. A first packet from a network is received. The first packet includes first data stored by a mass storage device. The first data is sent to a first mobile communication device via a first wireless communication link. The first mobile communication device is connected to a first computer system. The first mobile communication device is enumerated by the first computer system as a first locally attached mass storage device. The first mobile communication device communicates the first data to the first computer system as data that was stored on the first locally attached mass storage device. The first data is sent to a second mobile communication device via a second wireless communication link. The second mobile communication device is connected to a second computer system. The second mobile communication device is enumerated by the second computer system as a second locally attached mass storage device. The second mobile communication device communicates the first data to the second computer system as data that was stored on the second locally attached mass storage device.

A communication system is disclosed. An access network receives a first packet from a network. The first packet includes first data stored by a mass storage device. The access network sends the first data to a first mobile communication device via a first wireless communication link. The first mobile communication device is connected to a first computer system. The first mobile communication device is enumerated by the first computer system as a first locally attached mass storage device. The first mobile communication device communicates the first data to said first computer system as data that was stored on the first locally attached mass storage device. The access network sends the first data to a second mobile communication device via a second wireless communication link. The second mobile communication device is connected to a second computer system. The second mobile communication device is enumerated by said second computer system as a second locally attached mass storage device. The second mobile communication device communicates the first data to the second computer system as data that was stored on the second locally attached mass storage device.

A mass storage system is disclosed. A mass storage device is coupled to an interface. The interface is adapted to send a first block of data that is stored on the mass storage device to a first wireless communication interface connected to a first computer system. The first computer system receives the first block of data as data retrieved from a first locally connected mass storage device. The interface is adapted to send the first block of data that is stored on the mass storage device to a second wireless communication interface connected to a second computer system. The second computer system receives the first block of data as data retrieved from a second locally connected mass storage device.

DETAILED DESCRIPTION

Figure 1:
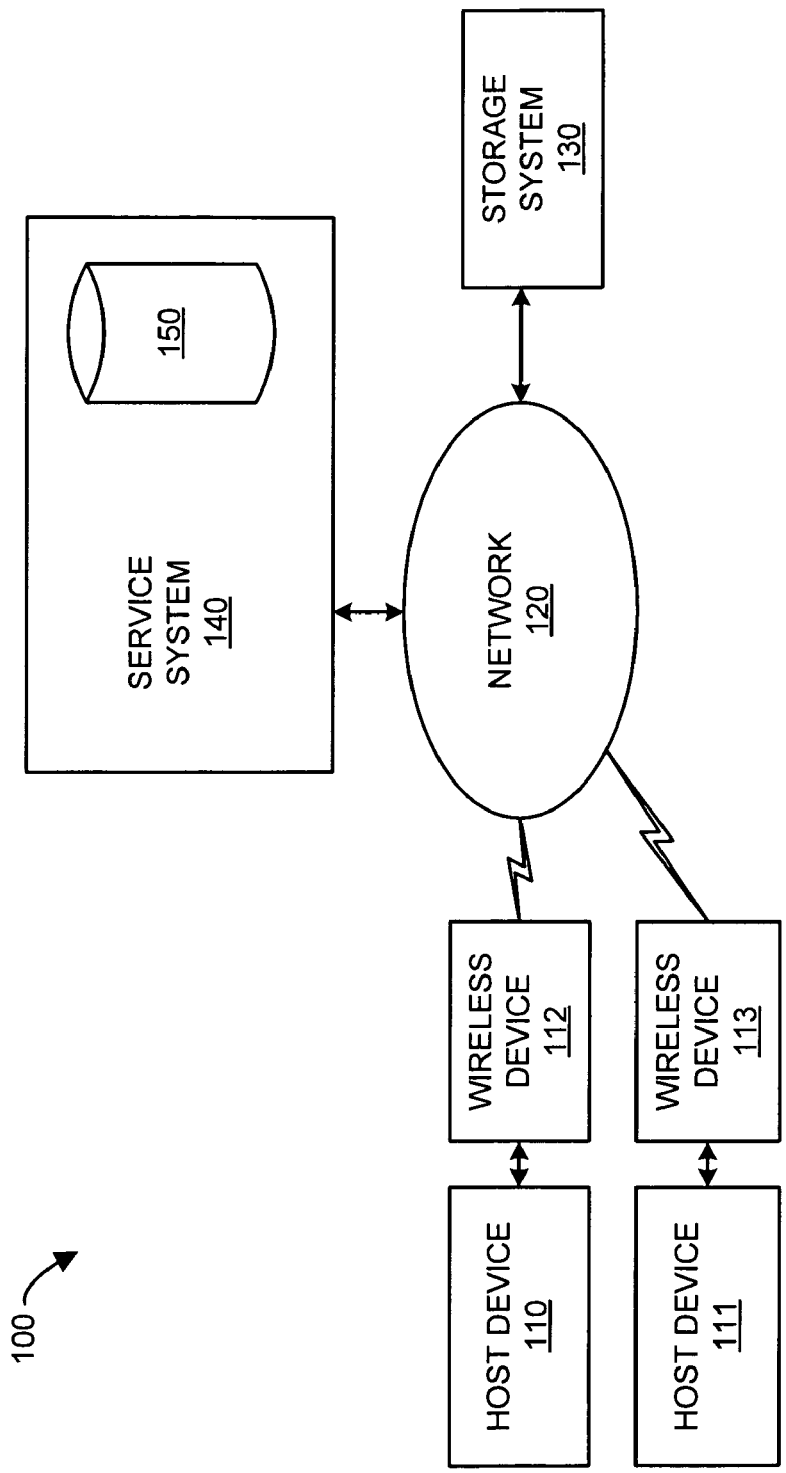
FIG. 1 is a block diagram illustrating a communication system for plug-in file sharing.

FIG. 1 is a block diagram illustrating a communication system for plug-in file sharing. In FIG. 1, communication system 100 comprises host device 110, host device 111, wireless device 112, wireless device 113, network 120, service system 140, and storage system 130. Service system 140 includes database 150. Host device 110 is connected to wireless device 112. Wireless device 112 is operatively coupled to network 120 via a broadband wireless connection. Thus, host device 110 is operatively coupled to network 120. Host device 111 is connected to wireless device 113. Wireless device 113 is operatively coupled to network 120 via a broadband wireless connection. Thus, host device 111 is operatively coupled to network 120.

Network 120 is operatively coupled to service system 140. Network 120 is also operatively coupled to storage system 130. Since service system 140 includes database 150, and network 120 and storage system 130 are both operatively coupled to service system 140, network 120 and storage system 130 are operatively coupled to database 150.

Network 120 may be any network or collection of networks that couple, link, or otherwise operatively connect wireless device 112 and wireless device 113 with each other or other devices or systems and is also operatively coupled to storage system 130. Network 120 may include other secondary data networks. In an example, network 120 may include a backhaul network, a local network, a long distance network, or a packet network, or any combination thereof, as well as other types of networks.

In an example, communication network 120 may be, or include all or parts of an IEEE 802.16 (WiMAX) specified system. These parts may include a base station (BS); an access services network (ASN), or connectivity service network (CSN). In another example, service system 140 may also be a part of a WiMAX specified system.

Service system 140 may be any system or collection of systems, such as database 150, capable of storing and retrieving information about at least one of: (a) services provided by network 120; (b) services provided by or to networks or users connected to network 120; or, (c) configuration information for network 120. In an example, service system 140 is part of a CSN and performs authentication, authorization, and accounting operations. In another example, service system 140 is a device capabilities server (DCS) and provides information about wireless device 112 and wireless device 113. Service system 140 may manage user or device profiles for authentication (e.g., verifying device identifier, user name, or password).

Service system 140 may provide configuration information to network 120 that specifies a type of service to deliver, and policies to enforce that may restrict access by, or services provided to, wireless device 112 and wireless device 113. For example, when wireless device 112 or wireless device 113 first couples to network 120, wireless device 112 or wireless device 113 may send a registration message to network 120 asking for permission to use network 120 to communicate to other systems. The registration message may include a device identifier. Network 120 may then forward that registration message, along with a device identifier to service system 140. Service system 140 may then query database 150 with the device identifier to determine if wireless device 112 or wireless device 113 may use network 120. Service system 140 may then inform network 120 whether wireless device 112 or wireless device 113 may use network 120.

A device identifier may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

Service system 140 may also query database 150 to provide configuration information to network 120 that determines how wireless device 112 or wireless device 113 may use network 120. For example, service system 140 may configure network 120 to operatively couple wireless device 112 only to storage system 130. This configuration would prevent wireless device 112 from utilizing other services such as operatively coupling to internet servers for viewing web pages Likewise, service system 140 may configure network 120 to operatively couple wireless device 113 only to storage system 130. This configuration would prevent wireless device 113 from utilizing other services such as operatively coupling to internet servers for viewing web pages.

Service system 140 may also configure network 120 to process data coming from, or destined for, wireless device 112 or wireless device 113. For example, service system 140 may configure network 120 to translate packets received from wireless device 112 or wireless device 113 from one format or protocol to another before sending these translated packets to storage system 130. In another example, service system 140 may configure network 120 to translate packets received from storage system 130 from one format or protocol to another before sending these translated packets to wireless device 112 or wireless device 113. It should also be understood that service system 140 may include additional elements not pictured for the sake of clarity.

Wireless device 112 or wireless device 113 may be any device, system, or other such communication platform capable of wirelessly communicating with network 120. Wireless device 112 or wireless device 113 may be, for example, a mobile phone, a wireless phone, a wireless modem, a wireless USB modem, a personal digital assistant (PDA), as well as other types of devices or systems that can communicate wirelessly with network 120.

Wireless device 112 may process enumeration requests to and from host device 110. For example, wireless device 112 may be connected to host device 110 via a USB port. To successfully communicate with each other, host device 110 and wireless device 112 may perform a USB enumeration process. Wireless device 112 may process enumeration requests to and from host device 110. Likewise, wireless device 113 may be connected to host device 111 via a USB port. To successfully communicate with each other, host device 111 and wireless device 113 may perform a USB enumeration process. This enumeration process is described in the Universal Serial Bus Specifications, revisions 1.1 and 2.0. In another embodiment, wireless device 112 or wireless device 113 may perform a different enumeration process. For example, wireless device 112 or wireless device 113 may perform a flash memory card enumeration process.

The enumeration process may also include a configuration process. To accomplish the configuration process, wireless device 112 may supply host device 110 with information about wireless device 112. One type of information that may be supplied to host device 110 by wireless device 112 is a device class. A device class helps inform host device 110 about the characteristics of wireless device 112. A device class may also help inform host device 110 about the protocols or capacities of wireless device 112. For example, wireless device 112 may inform host device 110 that it is a serial communication device, such as a modem.

Likewise, to accomplish the configuration process, wireless device 113 may supply host device 111 with information about wireless device 113. One type of information that may be supplied to host device 111 by wireless device 113 is a device class. A device class helps inform host device 111 about the characteristics of wireless device 113. A device class may also help inform host device 111 about the protocols or capacities of wireless device 113. For example, wireless device 113 may inform host device 111 that it is a serial communication device, such as a modem.

In an embodiment, wireless device 112 informs host device 110 that wireless device 112 should be configured and controlled as a mass storage device. Wireless device 113 informs host device 111 that wireless device 113 should be configured and controlled as a mass storage device. For example, wireless device 112 or wireless device 113 may, as part of a USB enumeration process, inform host device 110 or host device 111, respectively, that it should be enumerated as, and thus treated as, a USB Mass Storage Class (MSC) device. In another example, wireless device 112 or wireless device 113 may inform host device 110 or host device 111, respectively, that it should be enumerated as a removable mass storage device such as a flash memory card.

The USB Mass Storage Class is specified by the Universal Serial Bus Mass Storage Class Specification. The Universal Serial Bus Mass Storage Class Specification is a collection of documents that include the Universal Serial Bus Mass Storage Class Specification Overview, Revision 1.2; Universal Serial Bus Mass Storage Class Bulk-Only Transport, Revision 1.0; Universal Serial Bus Mass Storage Class Control/Bulk/Interrupt (CBI) Transport, Revision 1.1; Universal Serial Bus Mass Storage Class UFI Command Specification, Revision 1.0; Universal Serial Bus Mass Storage Specification For Bootability, Revision 1.0; and, the Universal Serial Bus Lockable Storage Devices Feature Specification, Revision 1.0. These documents are available from the USB Implementers Forum web page at www.usb.org.

As a result of wireless device 113 informing host device 111 that wireless device 113 should be configured and controlled as a mass storage device, host device 111 may treat wireless device 113 as a locally attached mass storage device. For example, host device 111 may enumerate wireless device 113 as a USB flash drive. That may mean that host device 111 would use portions of its operating system software, such as device drivers, intended to be used with a USB flash drive to configure, control, and communicate with wireless device 113. Host device 111 may use these portions of its operating system software even though wireless devices, in general, would normally be enumerated as communication devices.

If host device 110 is treating wireless device 112 as a locally attached mass storage device, it allows wireless device 112 to be treated as locally attached mass storage by non-driver parts of the operating system and applications. For example, if host device 110 were running a Windows XP operating system, wireless device 112 may appear under the "Devices with Removable Storage" heading of the "My Computer" folder. Alternatively, wireless device 112 may appear under the "Hard Disk Drives" heading of the "My Computer" folder.

If host device 111 is treating wireless device 113 as a locally attached mass storage device, it allows wireless device 113 to be treated as locally attached mass storage by non-driver parts of the operating system and applications. For example, if host device 111 were running a Windows XP operating system, wireless device 113 may appear under the "Devices with Removable Storage" heading of the "My Computer" folder. Alternatively, wireless device 113 may appear under the "Hard Disk Drives" heading of the "My Computer" folder.

Host device 110 or host device 111 may also use communication and configuration protocols intended for locally attached mass storage devices to communicate with wireless device 112 and wireless device 113, respectively. Wireless device 112 or wireless device 113 may emulate a mass storage device by also using the corresponding communication and configuration protocols to communicate with host device 110 and host device 111, respectively. For example, host device 110 or host device 111 may use Advanced Technology Attachment Packet Interface (ATAPI) command blocks and command sets to communicate with wireless device 112 or wireless device 113, respectively. Likewise, wireless device 112 and wireless device 113 would use ATAPI command blocks and command sets to communicate with host device 110 and host device 111, respectively.

In another example, host device 110 may use the Small Computer System Interface (SCSI) commands to communicate with wireless device 112. Likewise, wireless device 112 would use SCSI commands to communicate with host device 110. In the preceding examples, these protocols may be encapsulated in USB packets for communication with wireless device 112 via a USB port on host device 110. Host device 111 and wireless device 113 may interact in the same or a manner similar to those described previously for host device 110 and wireless device 112. Wireless device 112 or wireless device 113 may translate the communication and configuration protocols intended for locally attached mass storage devices into a format suitable for communication with mass storage system 130 via network 120.

Network 120 may process packets of data it exchanges with wireless device 112 via a wireless communication link. These packets of data may, for example, comprise data destined for storage by storage system 130. These packets of data may be data retrieved from storage system 130. This data may be data that is shared with host device 111 via wireless device 113. This shared data may be stored in a shared file that is stored by storage system 130.

In an embodiment, these packets of data may contain data with communication and configuration protocols intended for locally attached mass storage devices to communicate. For example, wireless device 112 or wireless device 113 may send, and network 120 may receive and process, packets of data with ATAPI command blocks and command sets. In another example, wireless device 112 or wireless device 113 may send, and network 120 may receive and process, SCSI commands. In another example, these protocols may be encapsulated in USB packets and wireless device 112 or wireless device 113 may send, and network 120 may receive and process these USB packets.

Network 120 may process packets of data received from wireless device 112 or wireless device 113 to translate them into data or commands for storage system 130. Network 120 may also process packets of data received from storage system 130 to translate them into data or commands for wireless device 112 or wireless device 113. For example, network 120 may translate packets of data received from wireless device 112 or wireless device 113 into commands or data that is understood by a storage area network (SAN). Network 120 may also translate packets of data received from a SAN into data or commands for wireless device 112 or wireless device 113.

In another example, network 120 may translate packets of data received from wireless device 112 or wireless device 113 with ATAPI, SCSI, flash memory card, or USB commands or protocols into commands or data that may be understood by a SAN. Network 120 may also translate packets of data received from a SAN into ATAPI, SCSI, flash memory card, or USB commands or protocols. These packets from a SAN, once translated, may be sent to wireless device 112 or wireless device 113.

Storage system 130 is computer data storage connected to a computer network providing data access to network clients. For example, storage system 130 may be a SAN or network attached storage (NAS). Storage system 130 may also be a part of network 120. Storage system 130 may comprise storage and a network that is separate from, but operatively coupled to, network 120.

In an embodiment, network 120 is configured so that host device 110 and host device 111 may share data stored by storage system 130. The shared data may be stored in a file stored by storage system 130. The shared data may be a file system or directory stored by storage system 130. Thus, by plugging wireless device 112 into host device 110, host device 110 is able to share data (in the form of a file or directory) with host device 111 via network 120 and storage system 130. Likewise, by plugging wireless device 113 into host device 111, host device 111 is able to share data with host device 110 via network 120 and storage system 130.

To access the shared data, network 120 may associate one or more device identifiers with a file or directory stored by storage system 130. The device identifiers may be associated with wireless device 112 or wireless device 113. The device identifiers may act as a security component for access to the shared data. In other words, access to the shared file or directory may be limited to access by host devices that communicate using a wireless device associated with particular device identifiers. Thus, access to the shared file or directory depends upon a connection with a wireless device with a device identifier that has been associated with the shared file or directory by network 120 or storage system 130.

In an embodiment, host device 110 and host device 111 may use wireless device 112, wireless device 113, and network 120 to exchange data. Because wireless device 112 or wireless device 113 are enumerated as locally attached mass storage, host device 110 and host device 111 can exchange data without the use of an extensive networking protocol stack or software.

Figure 2:
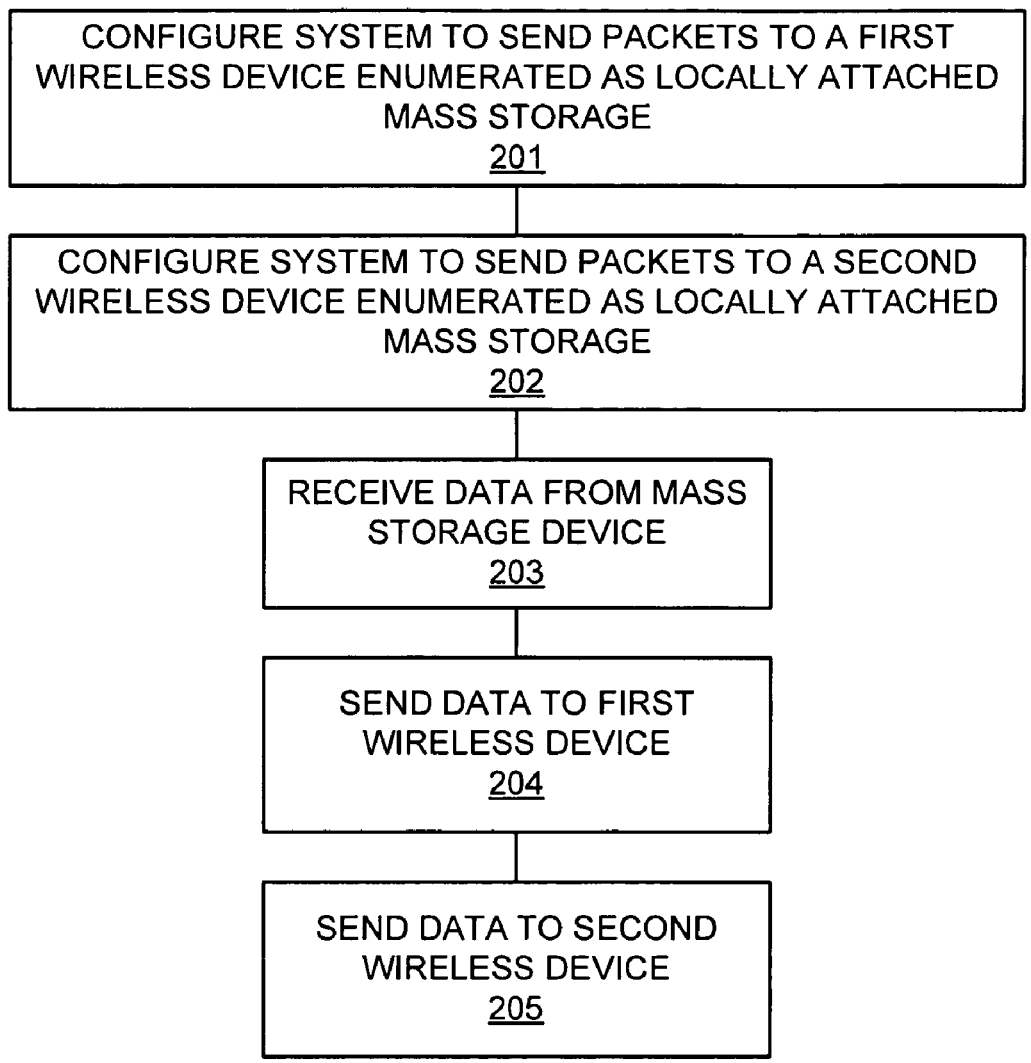
FIG. 2 is a flow chart illustrating a method of operating a communication system for plug-in file sharing.

FIG. 2 is a flowchart illustrating a method of operating a communication system to emulate a mass storage device. The method of FIG. 2 may be performed by communication system 100. A communication system is configured to send packets to a first wireless device enumerated by a computer system as locally attached mass storage (201). A communication system is configured to send packets to a second wireless device enumerated by a computer system as locally attached mass storage (202). Data is received from a mass storage device (203). In an example, this data may be received and processed by network 120. If network 120 is configured appropriately by service system 140, the packet may also be translated by network 120.

The data is sent to the first wireless device (204). The data is sent to the second wireless device (205). Thus, the data that was received from the mass storage device in block 203 is shared by the first and second wireless device. The data may have been sent by wireless device 112 or wireless device 113 to storage system 130. The data may be the original data received at 203. In addition, if network 120 is configured appropriately by service system 140, the data may be included in a packet or packets that have been translated by network 120.

Figure 3:
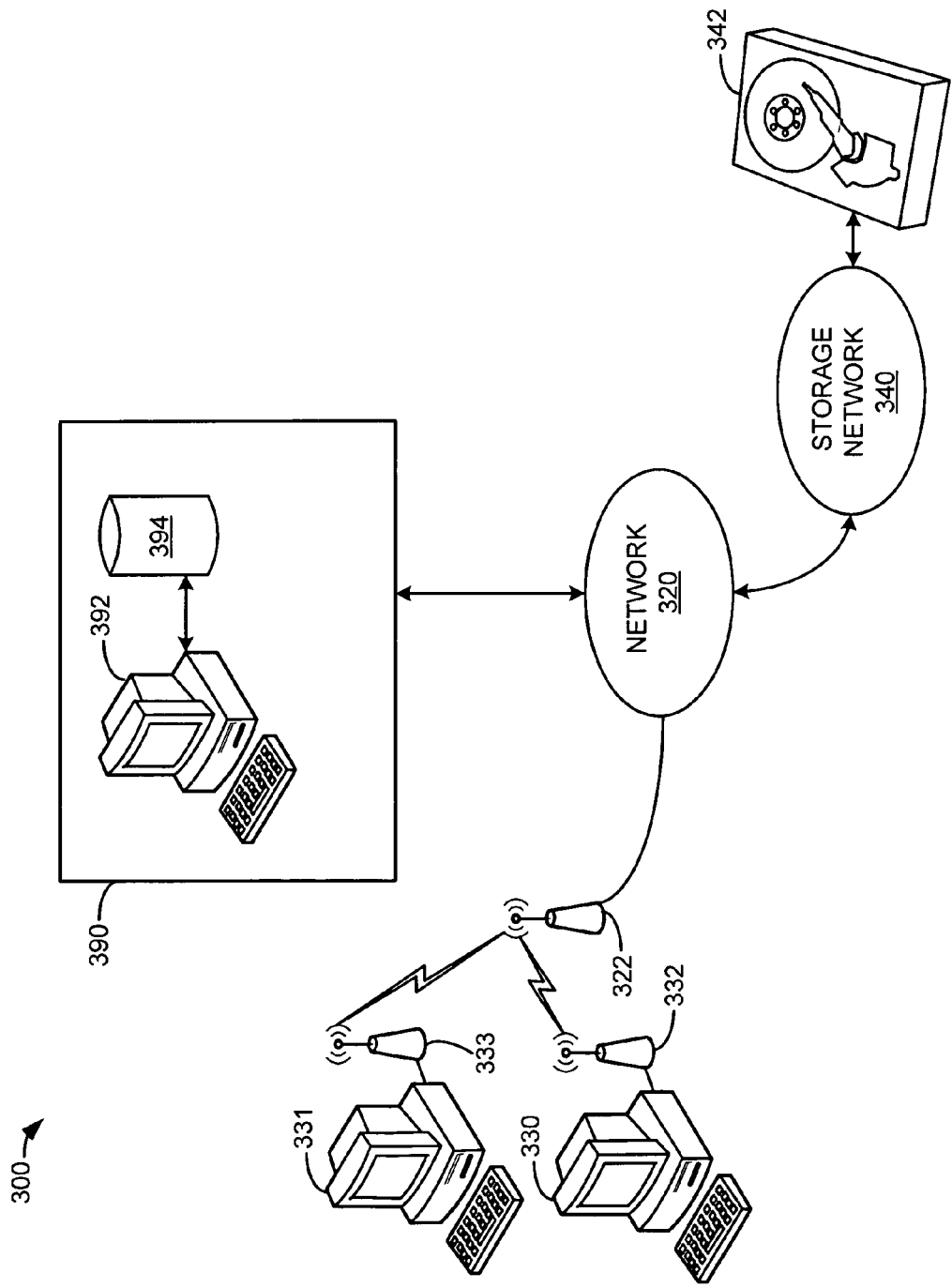
FIG. 3 is a block diagram illustrating a communication system for plug-in file sharing.

FIG. 3 is a block diagram illustrating a communication system for plug-in file sharing. In FIG. 3, communication system 300 comprises host computer 330, host computer 331, wireless device 332, wireless device 333, base station 322, network 320, storage network 340, storage 342, and service system 390. Service system 390 includes computer system 392 and database 394. Host computer 330 is locally and physically connected to wireless device 332. Wireless device 332 is operatively coupled to base station 322 via a long range wireless link. Base station 322 is operatively coupled to network 320. Thus, host computer 330 is operatively coupled to network 320 via wireless device 332 and base station 322. Host computer 331 is locally and physically connected to wireless device 333. Wireless device 333 is operatively coupled to base station 322 via a long range wireless link. Thus, host computer 331 is operatively coupled to network 320 via wireless device 333 and base station 322.

Network 320 is operatively coupled to service system 390. Network 320 is also operatively coupled to storage network 340. Storage network 340 is operatively coupled to storage 342. Since service system 390 includes computer system 392 and database 394, and network 320, storage network 340, and storage 342 are all operatively coupled to service system 390, then network 320, storage network 340, and storage 342 are operatively coupled to computer system 392 and database 394.

Network 320 could be any network or collection of networks that couple, link, or otherwise operatively connect base station 322, and by extension wireless device 332 and wireless device 333, with each other and other devices or systems and is also operatively coupled to storage network 340. Network 320 may include other secondary data networks. In an example, network 320 may include a backhaul network, a local network, a long distance network, or a packet network, or any combination thereof, as well as other types of networks.

In an example, communication network 320 may be, or include all or parts of an IEEE 802.16 (WiMAX) specified system. These parts may include additional base stations, an access services network (ASN), or connectivity service network (CSN). In another example, service system 390 may also be a part of a WiMAX specified system.

Service system 390 may be any system or collection of systems, such as computer system 392 and database 394, that is capable of storing and retrieving information about at least one of: (a) services provided by network 320, such as communication and storage services; (b) services provided by, or to, networks or users, connected to network 320, such as communication or storage services; or, (c) configuration information for network 320. Service system 390 can also configure network 320. In an example, service system 390 is part of a CSN and performs authentication, authorization, and accounting (AAA) operations. Service system 390 may manage user or device profiles for authentication (e.g., verifying device identifier, user name, or password). In another example, service system 390 is a DCS and provides information about wireless device 332 and wireless device 333 to network 320 and/or storage system 340.

Service system 390 may also configure network 320 to that specify the type of service to deliver, and policies to enforce that may restrict access by, or services provided to, wireless device 332, wireless device 333, host computer 330, or host computer 331. For example, when wireless device 332 or wireless device 333 first couples to base station 322, wireless device 332 or wireless device 333 may send a registration message to network 320 asking for permission to use network 320 to communicate to other systems. The registration message may include a device identifier. Network 320 may then forward that registration message, along with a device identifier to service system 390. Service system 390 may then use computer system 392 to query database 394 with the device identifier to determine if wireless device 332, wireless device 333, host computer 330, or host computer 331 may use base station 322 and network 320. Service system 390 may then inform network 320 or base station 322 whether the registering device may use network 320.

A device identifier may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

Service system 390 may also query database 394 to configure network 320 in a way that determines how wireless device 332, wireless device 333, host computer 330, or host computer 331 may use network 320. For example, service system 390 may configure network 320 to only operatively couple wireless device 332 to storage network 340. Likewise, service system 390 may configure network 320 to only operatively couple wireless device 333 to storage network 340. By extension, this configuration would function to limit host computer 330 and host computer 331 to only being operatively coupled with storage network 340 and storage 342. This configuration may also prevent host computer 330 and host computer 331 from utilizing other services such as operatively coupling to internet servers for viewing web pages.

Service system 390 may also configure network 320 to process data coming from, or destined for, host computer 330 or host computer 331. For example, service system 390 may configure network 320 to translate data received from wireless device 332 from one format or protocol to another before sending the translated data to storage 342 via storage network 340. Likewise, service system 390 may configure network 320 to translate data received from wireless device 333 from one format or protocol to another before sending the translated data to storage 342 via storage network 340.

In another example, service system 390 may configure network 320 to translate data received from storage 342 via storage network 340 from one format or protocol to another before sending the translated data to wireless device 332 or wireless device 333. It should also be understood that service system 390 may include additional elements not pictured for the sake of clarity.

Wireless device 332 or wireless device 333 may be any device, system, or other such communication platform capable of wirelessly communicating with base station 322 and thus network 320. Wireless device 332 or wireless device 333 may be, for example, a mobile phone, a wireless phone, a wireless modem, a wireless USB modem, a personal digital assistant (PDA), as well as other types of devices or systems that can communicate wirelessly with network 320.

Wireless device 332 or wireless device 333 may process enumeration requests to and from host computer 330 or host computer 331, respectively. For example, wireless device 332 may be connected to host computer 330 via a USB port. To successfully communicate with each other, host computer 330 and wireless device 332 perform a USB enumeration process. Likewise, wireless device 333 may be connected to host computer 331 via a USB port. To successfully communicate with each other, host computer 331 and wireless device 333 perform a USB enumeration process. This enumeration process is described in the Universal Serial Bus Specifications, revisions 1.1 and 2.0. In another embodiment, wireless device 332 or wireless device 333 may perform a different enumeration process. For example, wireless device 332 or wireless device 333 may perform a flash memory card enumeration process.

The enumeration process may also include a configuration process. To accomplish the configuration process, wireless device 332 may supply host computer 330 with information about wireless device 332. One type of information that may be supplied to host computer 330 by wireless device 332 is a device class. A device class helps inform host computer 330 about the characteristics of wireless device 332. A device class may also help inform host computer 330 about the protocols or capacities of wireless device 332. For example, wireless device 332 may inform host computer 330 that it is a serial communication device, such as a modem.

Likewise, to accomplish a configuration process, wireless device 333 may supply host computer 331 with information about wireless device 333. One type of information that may be supplied to host computer 331 by wireless device 333 is a device class. A device class helps inform host computer 331 about the characteristics of wireless device 333. A device class may also help inform host computer 331 about the protocols or capacities of wireless device 333. For example, wireless device 333 may inform host computer 331 that it is a serial communication device, such as a modem.

In an embodiment, wireless device 332 informs host computer 330 that wireless device 332 should be configured and controlled as a mass storage device. Wireless device 333 informs host computer 331 that wireless device 333 should be configured and controlled as a mass storage device. For example, wireless device 332 or wireless device 333 may, as part of a USB enumeration process, inform host computer 330 or host computer 331, respectively, that it should be treated as a USB Mass Storage Class (MSC) device.

The USB Mass Storage Class is specified by the Universal Serial Bus Mass Storage Class Specification. The Universal Serial Bus Mass Storage Class Specification is a collection of documents that include the Universal Serial Bus Mass Storage Class Specification Overview, Revision 1.2; Universal Serial Bus Mass Storage Class Bulk-Only Transport, Revision 1.0; Universal Serial Bus Mass Storage Class Control/Bulk/Interrupt (CBI) Transport, Revision 1.1; Universal Serial Bus Mass Storage Class UFI Command Specification, Revision 1.0; Universal Serial Bus Mass Storage Specification For Bootability, Revision 1.0; and, the Universal Serial Bus Lockable Storage Devices Feature Specification, Revision 1.0. These documents are available from the USB Implementers Forum web page at www.usb.org.

As a result of wireless device 332 informing host computer 330 that wireless device 332 should be configured and controlled as a mass storage device, host computer 330 may treat wireless device 332 as a locally attached mass storage device. For example, host computer 330 may enumerate wireless device 332 as a USB flash drive. That means that host computer 330 would use portions of its operating system software, such as device drivers, intended to be used with a USB flash drive to configure, control, and communicate with wireless device 332. Accordingly, host computer 330 would be controlling and communicating with wireless device 332 as if it was a USB flash drive. Host computer 330 may use these portions of its operating system software even though wireless devices in general would normally be enumerated as communication devices.

If host computer 330 is treating wireless device 332 as a locally attached mass storage device, it allows wireless device 332 to be treated as locally attached mass storage by non-driver parts of the operating system and applications. For example, if host computer 330 were running a Windows XP operating system, wireless device 332 may appear under the "Devices with Removable Storage" heading of the "My Computer" folder. Alternatively, wireless device 332 may appear under the "Hard Disk Drives" heading of the "My Computer" folder.

Likewise, if host computer 331 is treating wireless device 333 as a locally attached mass storage device, it allows wireless device 333 to be treated as locally attached mass storage by non-driver parts of the operating system and applications. For example, if host computer 331 were running a Windows XP operating system, wireless device 333 may appear under the "Devices with Removable Storage" heading of the "My Computer" folder. Alternatively, wireless device 333 may appear under the "Hard Disk Drives" heading of the "My Computer" folder.

Host computer 330 may also use communication and configuration protocols intended for locally attached mass storage devices to communicate with wireless device 332. Wireless device 332 may emulate a mass storage device by also using the corresponding communication and configuration protocols to communicate with host computer 330. Wireless device 332 may send and receive data to storage 342 via network 320 and storage network 340 to provide an emulated capacity (e.g., number of bytes) that is far greater than would normally be found on a locally attached mass storage device.

Likewise, host computer 331 may also use communication and configuration protocols intended for locally attached mass storage devices to communicate with wireless device 333. Wireless device 333 may emulate a mass storage device by also using the corresponding communication and configuration protocols to communicate with host computer 331.

Wireless device 333 may send and receive data to storage 342 via network 320 and storage network 340 to provide an emulated capacity (e.g., number of bytes) that is far greater than would normally be found on a locally attached mass storage device. In addition, because both host computer 330 and host computer 331 may store data in storage network 340, host computer 330 and host computer 331 may share data via wireless device 330 and wireless device 331, respectively, as if that shared data were stored on a locally attached mass storage.

In an example, host computer 330 may use ATAPI command blocks and command sets to communicate with wireless device 332. Likewise, wireless device 332 would use ATAPI command blocks and command sets to communicate with host computer 330. Host computer 331 may use ATAPI command blocks and command sets to communicate with wireless device 333. In this case, wireless device 333 would use ATAPI command blocks and command sets to communicate with host computer 331.

In another example, host computer 330 may use SCSI commands to communicate with wireless device 332. Likewise, wireless device 332 would use SCSI commands to communicate with host computer 330. Host computer 331 may use SCSI commands to communicate with wireless device 333. In this case, wireless device 333 would use SCSI commands to communicate with host computer 331. In the preceding examples, these protocols may be encapsulated in USB packets for communication with wireless device 332 or wireless device 333 via a USB port on host computer 330 or host computer 331, respectively.

In order to facilitate the emulation of a locally attached mass storage device by wireless device 332, network 320 may process the data it exchanges with wireless device 332. Network 320 may also process the data it exchanges with wireless device 333. These data may, for example, comprise data destined for storage 342. In an example, the data may contain data with communication and configuration protocols intended for locally attached mass storage devices to communicate. These communication and configuration protocols may be emulated by wireless device 332, wireless device 333, network 320, or storage network 340. These communication and configuration protocols may also be simply passed along to storage 342 so that storage 342 may process them natively.

In an example, wireless device 332 or wireless device 333 may send, and network 320 may receive, transfer, or process, data with ATAPI command blocks and command sets. In another example, wireless device 332 or wireless device 333 may send, and network 320 may receive, transfer, or process, SCSI commands. In another example, these protocols may be encapsulated in USB packets and wireless device 332 or wireless device 333 may send, and network 320 may receive, transfer, or process these USB packets.

Network 320 may process data received from wireless device 332 or wireless device 333 to translate them into data or commands for storage 342 or storage network 340. Network 320 may also process data received from storage 342 via storage network 340 to translate them into data or commands for wireless device 332 or wireless device 333. For example, network 320 may translate data received from wireless device 332 or wireless device 333 into commands or data that is understood by a storage network 340 or storage 342. Network 320 may also translate data received from storage 342 or storage network 340 into data or commands for wireless device 332 or wireless device 333.

In another example, network 320 may translate data received from wireless device 332 or wireless device 333 with ATAPI, SCSI, flash memory card, or USB commands or protocols into commands or data that may be understood by storage network 340 or storage 342. Network 320 may also translate data received from storage 342 or storage network 340 into ATAPI, SCSI, flash memory card, or USB commands or protocols. The data, once translated, may be sent to wireless device 332 or wireless device 333.

Storage network 340 and storage 342 comprise computer data storage connected to a computer network that provides data access to network clients. For example, storage network 340 together with storage 342 may be a SAN or NAS. Storage network 340 may comprise a network that is separate from, but operatively coupled to, network 320. In this case, storage 342 would also be separate from, but operatively coupled to, network 320. In an alternative, storage network 340 may be part of network 320. In this case, storage 342 may comprise storage that is part of network 320.

In an embodiment, network 320 is configured so that host computer 330 and host computer 331 may share data stored by storage network 340 or storage 342. The shared data may be stored in a file stored by storage 342. The shared data may be a file system or directory stored by storage system 342. Thus, by plugging wireless device 332 into host computer 330, host computer 330 is able to share data (in the form of a file or directory) with host computer 331 via network 320 and storage network 340. Likewise, by plugging wireless device 333 into host computer 331, host computer 331 is able to share data with host computer 330 via network 320 and storage network 340.

To access the shared data, network 320 may associate one or more device identifiers with a file or directory stored by storage 342. The device identifiers may be associated with wireless device 332, wireless device 333, or both. The device identifiers may act as a security component for access to the shared data. In other words, access to the shared file or directory may be limited to access by host devices that communicate using a wireless device associated with particular device identifiers. Thus, access to the shared file or directory depends upon a connection with a wireless device that has a device identifier that has been associated with the shared file or directory by network 320 or storage network 340.

In an embodiment, host computer 330 and host computer 331 may use wireless device 332, wireless device 333, and network 320 to exchange data. Because wireless device 332 or wireless device 333 are enumerated as locally attached mass storage, host device 330 and host device 331 can exchange data without the use of an extensive networking protocol stack or software.

Figure 4:
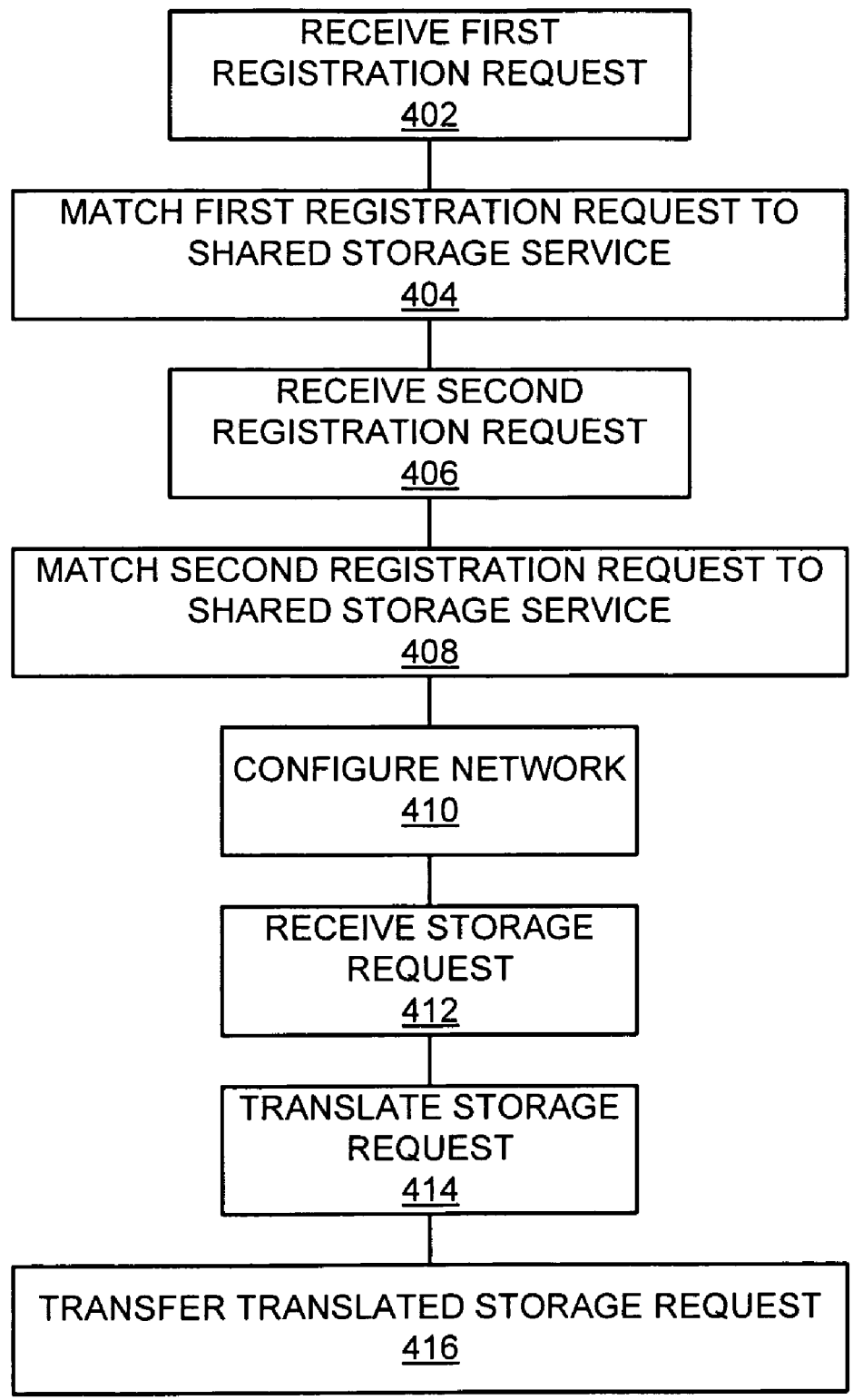
FIG. 4 is a flow chart illustrating a method of operating a communication system for plug-in file sharing.

FIG. 4 is a flow chart illustrating a method of operating a communication system for plug-in file sharing. The steps of FIG. 4 may be performed by communication system 300 or 100. A first registration request is received (402). For example, the first registration request may be received from wireless device 332 by base station 322. Base station 322 may then forward the registration request to network 320 which may further forward the registration request to service system 390.

The first registration request is matched to a shared storage service (404). For example, service system 390 may match the registration request to a shared storage service by querying database 394. The first registration request may be the registration request received in block 404. The registration request may be matched to a storage service by an association of a first device identifier to a shared storage service. For example, a MAC address given in the registration request may be associated with a uniform resource locator (URL) that specifies the shared storage service. In another example, a MAC address may be associated with an internet protocol (IP) address and user datagram protocol (UDP) port number that provides the shared storage service. In another example, a URL identifies a computer system and a location (e.g., folder or directory) that will act as the shared storage service.

A second registration request is received (406). For example, the second registration request may be received from wireless device 333 by base station 322. Base station 322 may then forward the registration request to network 320 which may further forward the registration request to service system 390.

The second registration request is matched to the shared storage service (408). For example, service system 390 may match the registration request to the shared storage service by querying database 394. The second registration request may be the registration request received in block 406. The registration request may be matched to the storage service by an association of a second device identifier to the shared storage service. For example, a MAC address given in the registration request may be associated with a uniform resource locator (URL) that specifies the shared storage service. In another example, a MAC address may be associated with an internet protocol (IP) address and user datagram protocol (UDP) port number that provides the shared storage service. In another example, a URL identifies a computer system and a location (e.g., folder or directory) that will act as the shared storage service.

The shared storage service may be the same file, folder, or directory matched to the first device identifier and the second device identifier. Thus, the two devices associated with the first device identifier and the second device identifier will share the data stored in that file, folder, or directory, respectively, by the shared storage service.

A network is configured to supply the matched storage service to the devices that made the registration requests in steps 402 and 406 (410). For example, network 320 may be configured to route data exchanged with wireless device 332 and wireless device 333 via base station 322 to storage network 340. Network 320 may also be configured to translate data received from, or going to, wireless device 332 and wireless device 333. Examples of types of translations that may be performed are given in the discussion of network 320.

In another example, network 320 may be configured to ignore or change routing information in data from wireless device 332 or wireless device 333. By ignoring or changing the routing information in data from wireless device 332 or wireless device 333, network 320 may be configured to limit wireless device 332 or wireless device 333 to communicating with storage network 340 and/or storage 342. Network 320 may also be configured to implement certain protocols necessary to establish a shared storage session with storage network 340 or storage 342 thereby allowing wireless device 332 and wireless device 333 to implement a small set of protocols in order to share data that appears as locally attached mass storage device to their respective host computers.

A storage request is received (412). In an example, this request is received by network 320 from wireless device 332, wireless device 333, or storage network 340. The storage request may be, for example, to read or write a block of data. In another example, the storage request may be of a higher level nature such as a request for directory information (e.g., file name, size, read-write properties, date of modification, etc.). In an embodiment, the set of types of requests would include those that are necessary for wireless device 332 or wireless device 333 to appear to their respective host computers as a locally attached mass storage device that stores the data stored by the shared storage service matched to wireless device 332 or wireless device 333 in steps 404 and 408, respectively. The set of types of requests would depend, at least in part, upon the configuration of network 320 and which protocols related to the storage service are implemented by wireless device 332, wireless device 333, network 320, storage network 340, and storage 342.

The storage request is translated (414). In an example, the storage request is translated by network 320. In another example, the storage request is translated by wireless device 332 or wireless device 333. In another example, the storage request is translated by storage network 340. Discussions of the types of translations that may be performed have been given previously.

The translated storage request is transferred (416). In an example, the translated storage request is transferred to storage network 340. In an example, the translated storage request is transferred to storage 342. In an example, the translated storage request is transferred to network 320. In an example, the translated storage request is transferred to wireless device 332. In an example, the translated storage request is transferred to wireless device 333.

In a further example, the translated storage request may comprise a command to read or write data to or from storage 342. In this example, host computer 330 may have made a request to read data from the locally attached mass storage device that wireless device 332 is enumerated as. For example, this request may comprise a SCSI request encapsulated in a USB packet. At least one of wireless device 332, network 320, or storage network 340 translates this request into another protocol. For example, the encapsulated SCSI request may be translated to a file transfer protocol (FTP) request. The FTP request is then transferred to storage network 340.

Continuing the example, storage network 340 may then respond to the request with another request. For example, storage network 340 may respond with data that wireless device 332 requested in the encapsulated SCSI request. The response request may be requesting that the response data be sent to wireless device 332. At least one of wireless device 332, network 320, or storage network 340 translates this request into another protocol. For example, the response data may be translated into a SCSI response encapsulated in a USB packet. Similar examples may include storage requests by wireless device 333.

Figure 5:
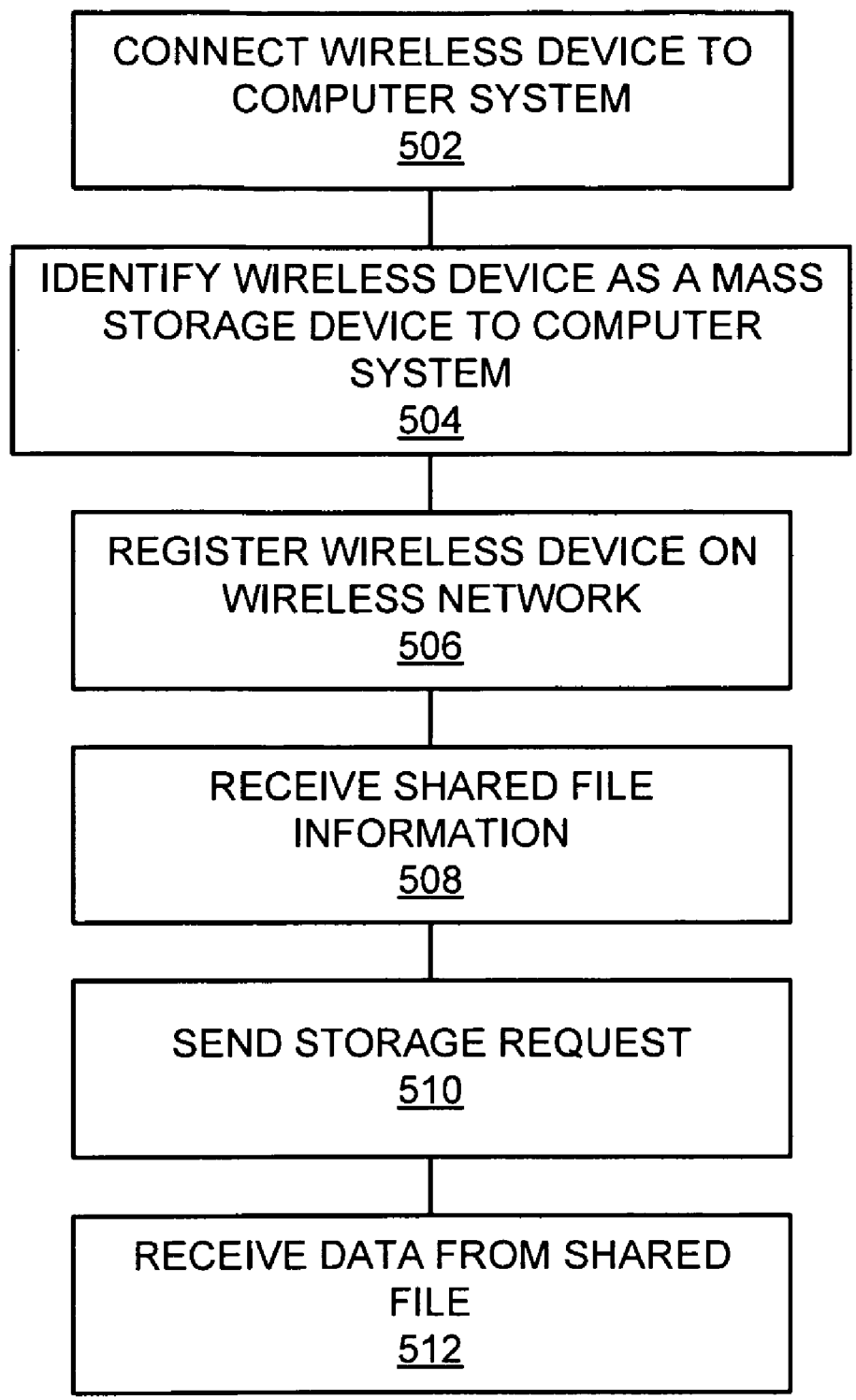
FIG. 5 is a flow chart illustrating a method of operating a wireless device for plug-in file sharing.

FIG. 5 is a flow chart illustrating a method of operating a wireless device for plug-in file sharing. The steps illustrated in FIG. 5 may be performed by wireless device 332 or wireless device 333.

A wireless device is connected to a computer system (502). For example, wireless device 332 may be connected to host computer 330. The wireless device is identified to the computer system as a mass storage device (504). For example, wireless device 332 may identify itself to host computer 330 as a USB MSC device.

The wireless device is registered on a wireless network (506). For example, wireless device 332 may register on network 320. Shared file information is received (508). For example, network 320 may provide wireless device 320 with information about a file stored by storage network 340 that is shared with host computer 331. This information may be typical file system directory information such as file size, file type, read/write permissions, and so on. Some or all of this information may be presented by wireless device 332 to host computer 330 to emulate a locally attached mass storage device.

A storage request is sent (510). For example, wireless device 332 may send a read data request to storage network 340 via network 320. Data is received from a shared file (512).

For example, the read data request sent in step 510 may cause storage network 340 to return data from a file that is shared with host computer 331. Wireless device 332 may then send this data to host computer 330 as data that was stored on a locally attached mass storage device.

The methods, systems, networks, databases, and storage described above may be implemented with or executed by one or more computer systems. The methods described above may also be stored on a computer readable medium. Many of the elements of communication network 100 and communication network 300 may be, comprise, or include computers systems. This includes, but is not limited to communication system 100, host device 110, host device 111, wireless device 112, wireless device 113, network 120, service system 140, storage system 130, database 150, communication system 300, host computer 330, host computer 331, wireless device 332, wireless device 333, base station 322, network 320, storage network 340, storage 342, service system 390, computer system 392 and database 394.

Figure 6:
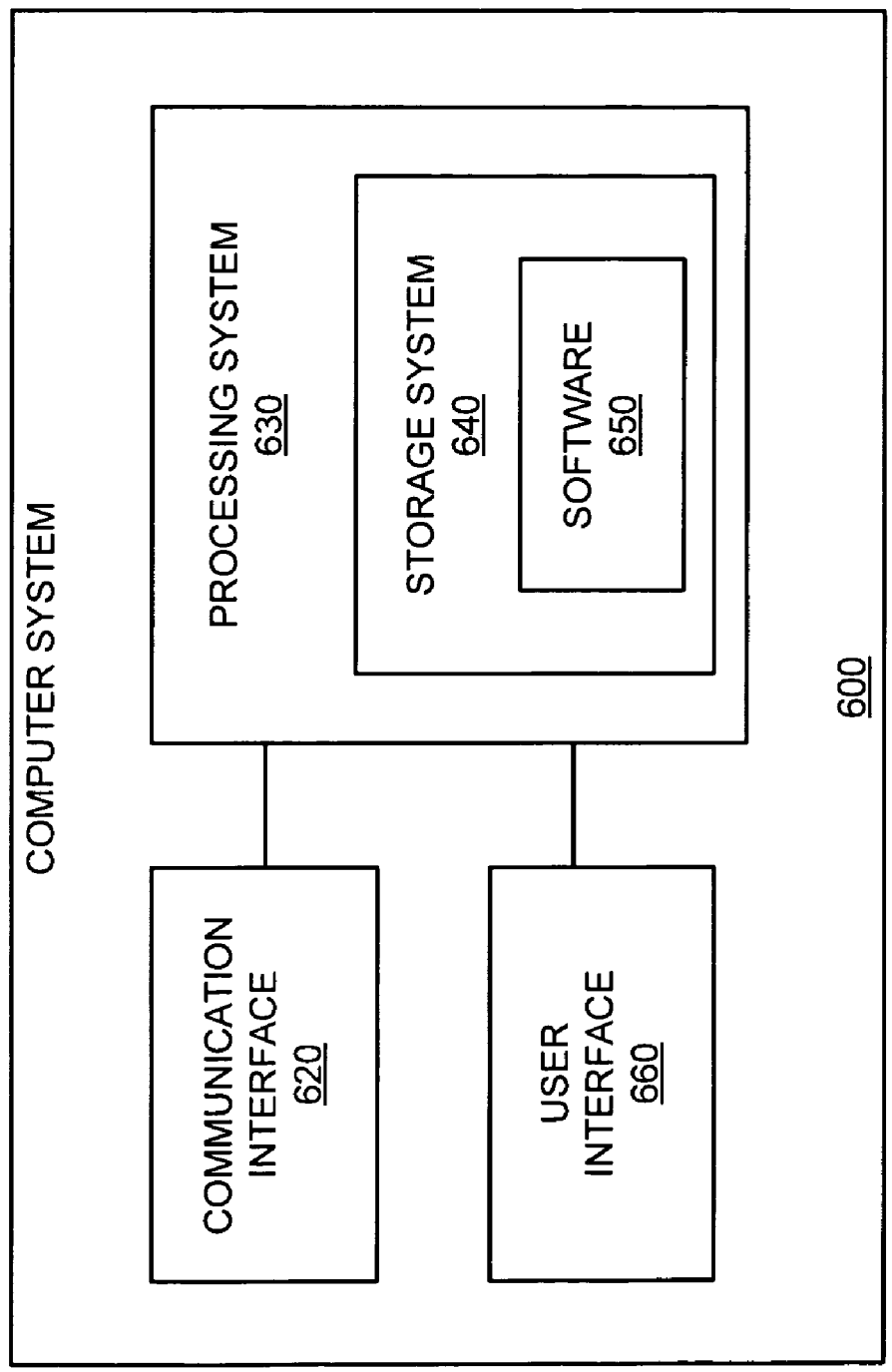
FIG. 6 is a block diagram illustrating a computer system.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    receiving first data from a network, wherein the first data includes data stored by a mass storage device;
    sending the first data to a first mobile communication device via a first wireless communication link, wherein said first mobile communication device is connected to a first computer system;
    and wherein said first mobile communication device is enumerated by said first computer system as a first locally attached mass storage device;
    and wherein said first mobile communication device communicates the first data to the first computer system as data that was stored on the first locally attached mass storage device;
    sending the first data to a second mobile communication device via a second wireless communication link, wherein said second mobile communication device is connected to a second computer system;
    and wherein said second mobile communication device is enumerated by said second computer system as a second locally attached mass storage device;
    and wherein said second mobile communication device communicates the first data to the second computer system as data that was stored on the second locally attached mass storage device; associating the first data to the first mobile communication device using a first device identifier, wherein the first device identifier is associated with the first mobile communication device;
    associating the first data to the second mobile communication device using a second device identifier, wherein the second device identifier is associated with the second mobile communication device;
    receiving second data from the second mobile communication device via the second wireless communication link;
    sending the second data to the network for storage by a mass storage system;
    receiving the second data from the mass storage system via the network; and
    sending the second data to the first mobile communication device via the first wireless communication link.

2. The method of claim 1, further comprising:
    receiving second data from the second mobile communication device via the second wireless communication link, wherein the second data includes the first data; and,
    sending the first data to the network for storage by a mass storage system.

3. The method of claim 1, further comprising:
    associating the second data to the first mobile communication device using a first device identifier, wherein the first device identifier is associated with the first mobile communication device.

4. The method of claim 1 wherein said first wireless communication link is a broadband long distance wireless communication link.

5. The method of claim 4 wherein said broadband long distance wireless communication link comprises a WiMAX specified system.

6. The method of claim 1, further comprising:
    configuring said communication system to allow said first mobile communication device to communicate with said mass storage system; and,
    configuring said communication system to allow said second mobile communication device to communicate with said mass storage system.

7. A mass storage system, comprising:

a mass storage device;

an interface coupled to said mass storage device;

wherein said interface is adapted to send a first block of data stored on the mass storage device to a first wireless communication interface connected to a first computer system;

and wherein the first computer system receives the first block of data as data retrieved from a first locally connected mass storage device;

and wherein said interface is adapted to send the first block of data stored on the mass storage device to a second wireless communication interface connected to a second computer system;

and wherein the second computer system receives the first block of data as data retrieved from a second locally connected mass storage device;

and wherein said interface associates the first block of data to the first wireless communication interface using a first interface identifier, wherein the first interface identifier is associated with the first wireless communication interface;

and wherein said interface associates the first block of data to the second wireless communication interface using a second interface identifier, wherein the second interface identifier is associated with the second wireless communication interface;

and wherein the second wireless communication interface sends a second block of data to the interface for storage by the mass storage device as data sent to a third locally connected mass storage device;

and wherein said interface is adapted to receive the second block of data from the second wireless communication interface;

and wherein said interface is adapted to store the second block of data on the mass storage device;

and wherein said interface is adapted to send the second block of data to the first wireless communication interface;

and wherein the first wireless communication interface receives the second block of data as data retrieved from a fourth locally connected mass storage device.

8. A mass storage system of claim 7 wherein the mass storage system associates the first block of data with the first wireless communication interface using a device identifier provided by the first wireless communication interface.

9. The mass storage system of claim 7 wherein the mass storage system associates the first block of data with the first computer system using a device identifier provided by the first wireless communication interface.

10. The mass storage system of claim 7 wherein the first wireless communication interface provides a device identifier to a wireless network and a wired network;

and wherein the wired network associates the mass storage system and the first block of data with the first wireless communication interface;

and wherein the second wireless communication interface provides a device identifier to the wireless network and the wired network; and, wherein the wired network associates the mass storage system and the first block of data with the second wireless communication interface.

* * * * *